Jan. 27, 1970 B. R. McFADDEN 3,492,447

CARD READER

Filed July 7, 1967 5 Sheets-Sheet 1

Jan. 27, 1970 B. R. McFADDEN 3,492,447

CARD READER

Filed July 7, 1967 5 Sheets-Sheet 2

Jan. 27, 1970 B. R. McFADDEN 3,492,447

CARD READER

Filed July 7, 1967 5 Sheets-Sheet 3

United States Patent Office 3,492,447
Patented Jan. 27, 1970

3,492,447
CARD READER
Bruce Richard McFadden, Harrisburg, Pa., assignor to AMP Incorporated, Harrisburg, Pa.
Filed July 7, 1967, Ser. No. 651,743
Int. Cl. H01h 43/08
U.S. Cl. 200—46 11 Claims

ABSTRACT OF THE DISCLOSURE

The disclosure relates to a card reader for reading punched cards and which includes a plurality of card stabilizers positioned along columns of contact spring members and slightly below the lower edges of the contact springs to provide a smoothing effect for mutilated punched cards to be read and thereby substantially flattening same for accurate reading by the card reader. The disclosure also relates to a card reader having a plurality of high riser cams wherein the contact spring members are spaced away from the card to be read and do not hit the card until the contact springs are aligned with the regions at which they are to make ultimate contact, thereby eliminating contact arm movement from hole to hole of the card and preventing card mutilation caused thereby.

This invention relates to a card reader and more particularly to an improved card reader of the type utilized to receive standard punched tabulating cards and develop therefrom electrical signals representative of the intelligence carried thereon and afterwards eject the cards in response to manual actuation of the card reader.

Card readers for developing electrical signal information from punched tabulating cards have been known in the art. These prior art devices, while providing a highly desirable function in the art, have suffered from various problems which the art continually attempts to overcome. One such improvement is set forth in the U.S. Patent of Glenn R. Ekers, No. 3,352,981, which is incorporated herein in its entirety by reference. The present invention forms an improvement of the above identified patent.

The above mentioned Ekers patent comprised a substantial advance over prior art card reader systems and has found great commercial success. However, in operation, it was found that certain minor deficiencies did exist. Two particular problems arose in that mutilated punched tabulating cards, especially those having a very large number of perforation therein, did not always line up with the spring contact members of the card reader and therefore provided erroneous results. A further problem arose in that, while entering of the tabulating cards into the card reader, the contact springs had a tendency to rub over the card from hole to hole while arriving in the proper reading position. This caused mutilation of the cards and therefore required periodic replacement thereof at substantial cost.

In accordance with the present invention, the above problems of the prior art are overcome by providing a plurality of card stabilizers of insulating material which are positioned between columns of contact springs in order to flatten out the tabulating card when entering same into the card reader. The card stabilizers can be placed between each column of contact springs, though it has been found that the card stabilizers need not be positioned adjacent each column of contact springs but can be placed several columns apart and still operate in an efficient manner. The present invention also includes a plurality of riser cams, the contact springs being positioned out of contact with the tabulating card until the tabulating card is properly positioned below the contact spring columns associated with the apertures therein. At this point, the camming surface will raise the tabulating card and printed circuit pads relative to the contact springs so that the contact springs will make contact directly into the apertures in the tabulating card rather than rubbing over the card from row to row until proper positioning is accomplished.

It is therefore an object of this invention to provide a manual card reader of improved construction which is more reliable and has a longer mechanical life than card reader devices heretofore available.

It is a further object of the invention to provide a card reader having an improved card handling mechanism which is less damaging to the cards utilized therewith than devices heretofore available.

It is another object of the invention to provide a card reader having novel card stabilizers therein to prevent errors in the reading of mutilated tabulating cards.

It is a yet further object of the invention to provide a card reader having novel high riser cams to cause initial contact between the contact springs and the tabulating card at the predetermined reading position.

The above object and still further objects of the present invention will become apparent to those skilled in the art upon a reading of the following detailed description taken in conjunction with the drawings in which there are shown and described an illustrative preferred embodiment of the invention. It is to be understood, however, that the preferred embodiment is not intended to be exhaustive or limiting of the invention and is provided for purposes of illustration in order that others, skilled in the art, may fully understand the invention and the principles thereof and the manner of applying it in practical use so that they may modify it in various forms, as may be best suited to the conditions of a particular use.

In the dawings:

Figures 1, 4:
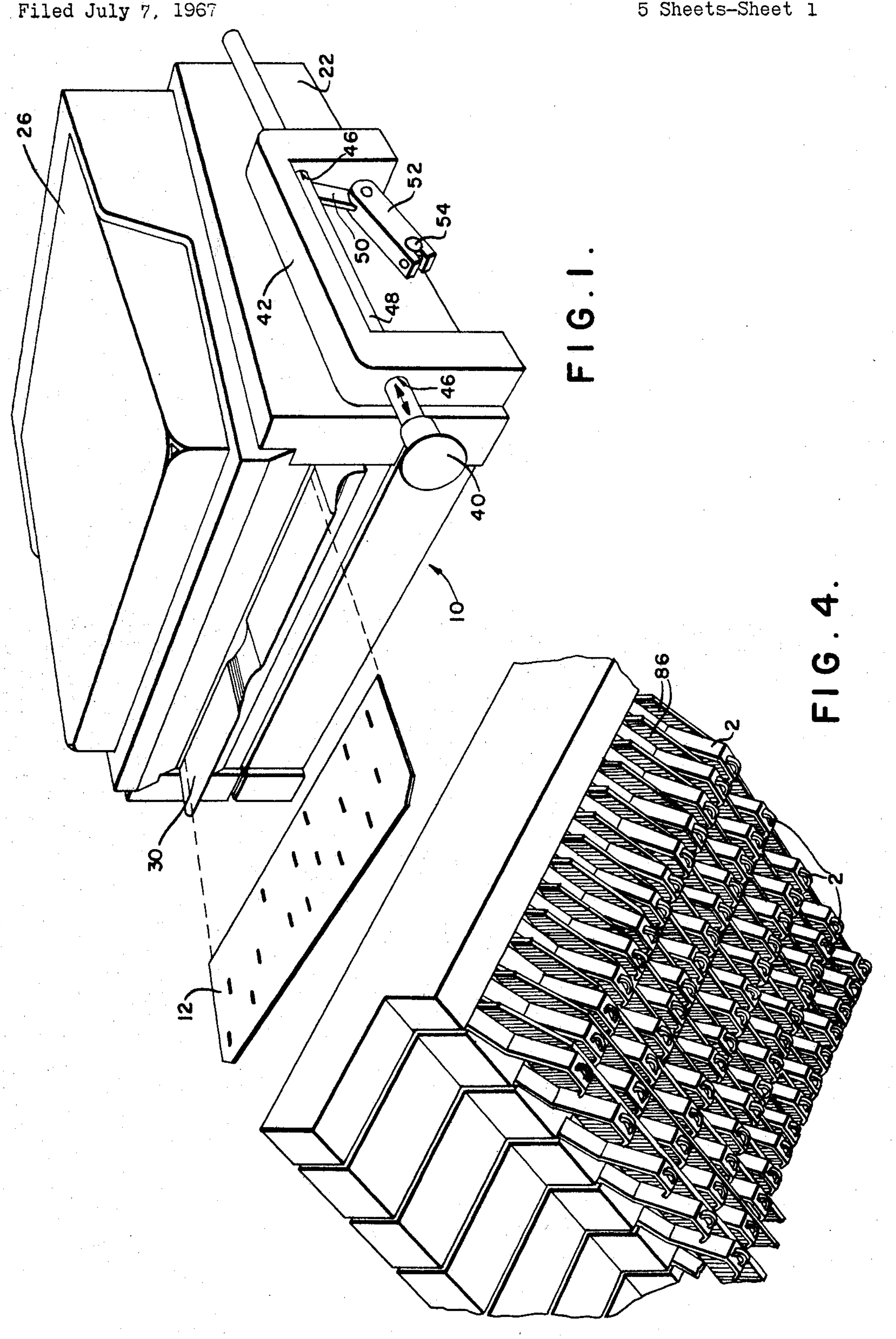
FIGURE 1 is a perspective view of the card reader of the present invention showing its general configuration, housing and arrangement for exterior parts relative to a card to be inserted therein.
FIGURE 4 is an enlarged view of the contact spring assembly of FIGURES 2 and 3.

Referring first to FIGURE 1, there is shown the card reader of the present invention which is an improvement over the card reader of the U.S. patent of Patrick et al., No. 3,308,672 and the U.S. patent of Glenn R. Ekers, No. 3,352,981 both disclosures of which are incorporated herein by reference in their entireties.

The assembly 10 represents what is known as a static card reader. It is the function of the device to receive a data card 12 having holes punched therein and to read such card by developing electrical signals on leads associated with the presence of such holes. The assembly 10 includes a base 22, a detachable cover 26 and a drawer 30 which is adapted to be driven from an open position to the closed position shown to carry the data card into engagement with a series of contact spring members under increasing wedging pressure. This results in the spring members penetrating available card holes to contact printed circuit pads disposed on the upper face of the drawer 30. Reference is made to the above mentioned patents for a detailed description of this operation.

The various movements of the drawer are controlled by an operating handle here shown as 40 which is pulled out to open the drawer and is pushed in to the position shown to close the drawer to effect reading.

The driving mechanism includes a bracket 42 affixed to the side of the reader base 22. This bracket is generally U shaped and can include a cover plate. In the arms of bracket 42 are apertures 46 adapted to support the sliding movement of the driving mechanism and contain the drive train and linkage which is comprised of a shaft 48 and links 50 and 52, which are tied thereto and further to a shaft 54. Rotary movement of the shaft 54 operates to drive the reader drawer 30 in and out of the assembly as described in the above mentioned patents.

Figure 2:
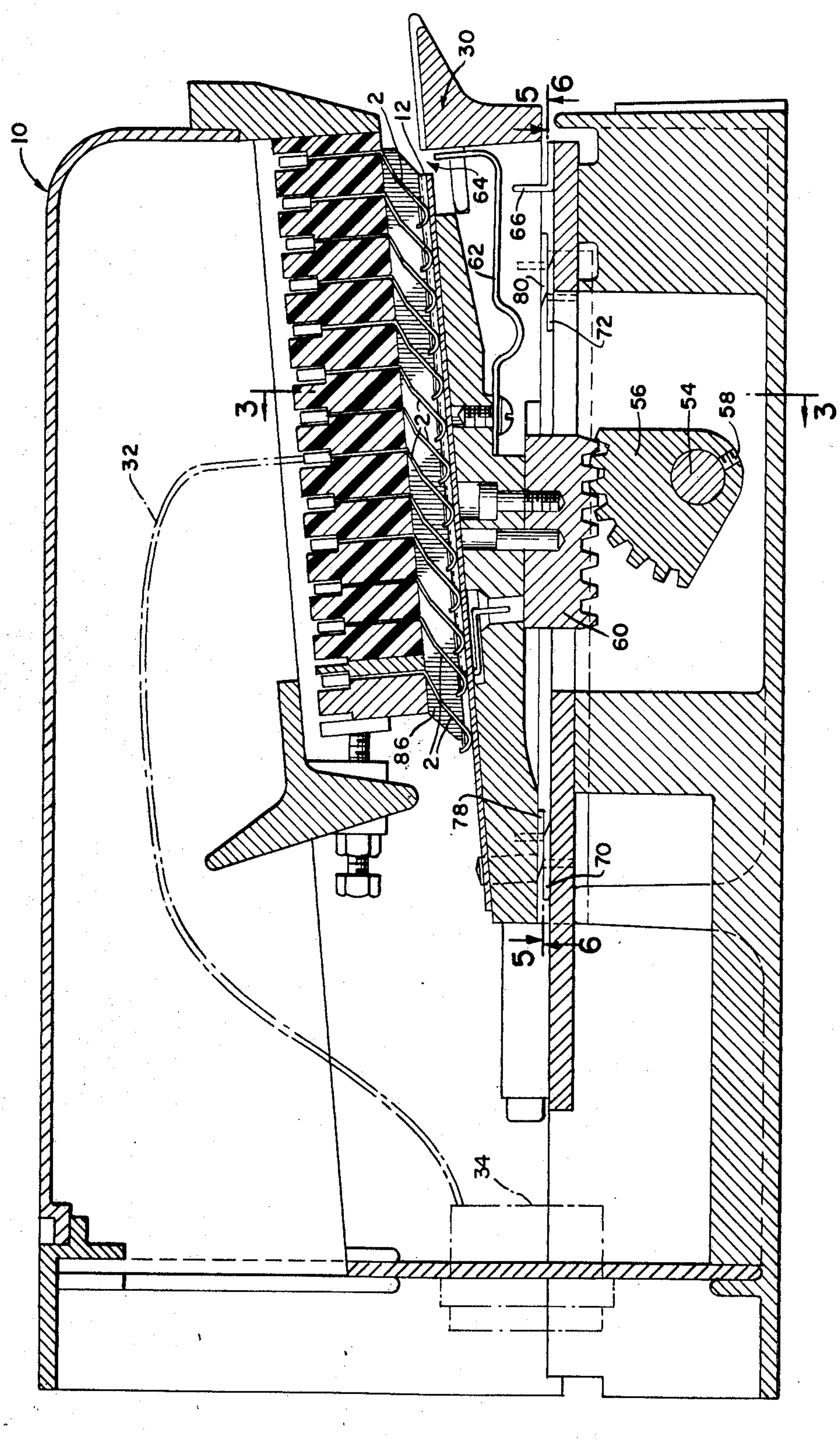
FIGURE 2 is a cross-sectional view of the card reader of the present invention.
Figure 3:
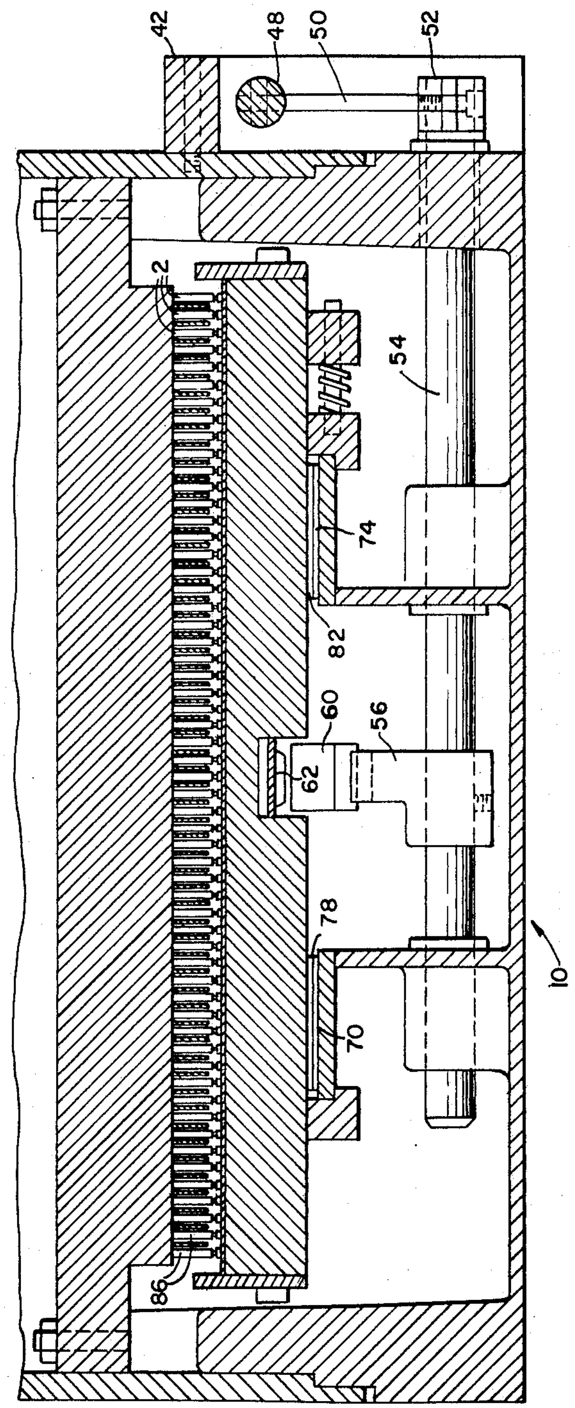
FIGURE 3 is a cross-sectional view taken along the line 3—3 of FIGURE 2.

The above features may be better visualized from FIGURES 2 to 8. FIGURE 2 depicts the unit 10 with the drawer closed and a tabulating card 12 shown in phantom inserted therein under rows of spring members 2. Only the end spring members are shown in this figure. the spring members being better shown in FIGURE 4 where all of the rows and columns thereof are shown. As can be seen therefrom, certain ones of these springs are positioned above slots or holes in the card defining the intelligence contact thereof and these spring members opposite the holes or slots pass therethrough to engage conductive circuit paths beneath the card 12. The remaining spring members ride on top of the card. There is further shown a conductive lead 32 which is representative of the conductive leads connecting all of the contact springs 2 with input and output units (shown in the Ekers Patent No. 3,352,981). Lead 32 is connected to a block 34, fitted in the rear of the unit 10, which serves in common all of the conductive leads of the unit. Block 34 is preferably of a type mounting in close proximity a considerable number of male contact spring members which receive female contact members mounted in a block (not shown), adapted to engage block 34 to interconnect conductive leads of unit 10 with a bundle of leads connecting the unit to associated input and output units (not shown).

As stated, in the discussion of FIGURE 1, the handle mechanism causes shaft 54 to rotate and thereby causes drawer 30 to open and close in accordance with the handle mechanism. The shaft 54 is connected to a gear 56 by means of a key member 58 and thereby causes the gear 56 to rotate in accordance with the rotation of the shaft 54. The rotation of the gear 56, which meshes with the pinion gear 60, drives the drawer 30 to and fro within the card reader housing.

Figure 8:
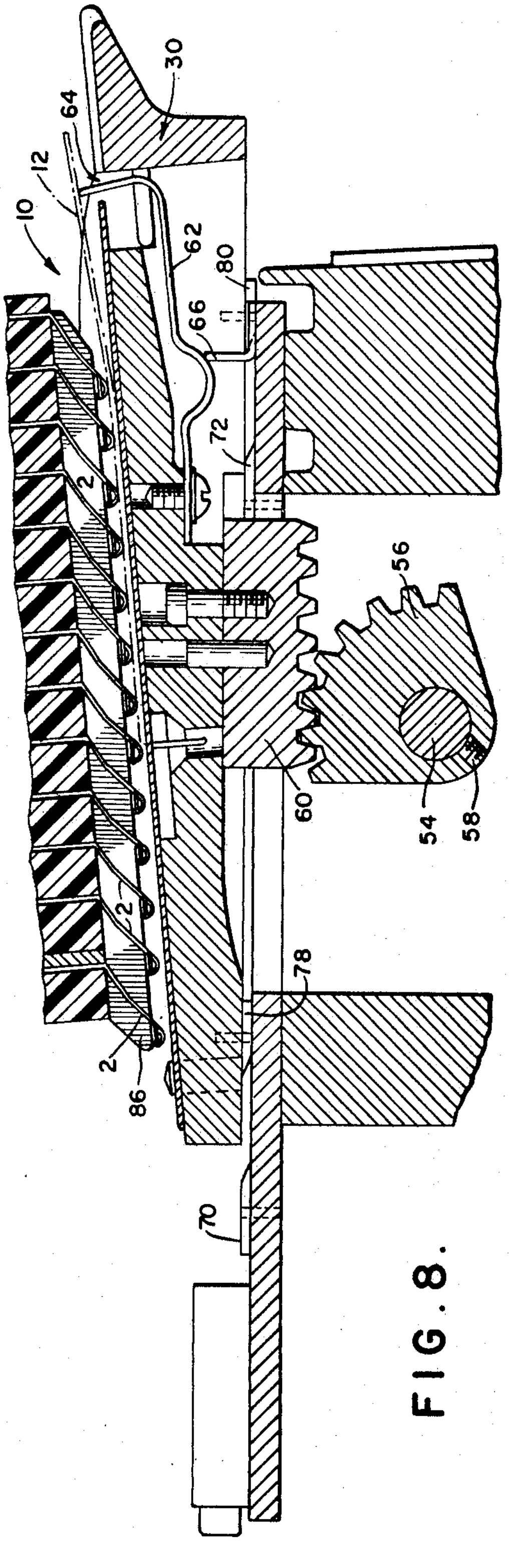
FIGURE 8 is a cross-sectional view as in FIGURE 2 with the carriage open.

With the handle 40 pulled outwardly and the shaft 54 in its extreme counterclockwise position, with respect to FIGURE 1 and extreme clockwise position with respect to FIGURE 8, the drawer will be in the completely opened position as shown in FIGURE 8. In this position, the spring member 62 is forced upwardly through aperture 64 in the card holder member 30 by means of a biasing member 66. This action serves to lift the card 12 for easy removal from the card rear. In this position of the carriage, the card will also be inserted in onto the carriage member or drawer 30, the spring members 2 being positioned above the carriage member 30 by a sufficient distance so that the card 12 can easily be slid there beneath.

Figure 6:
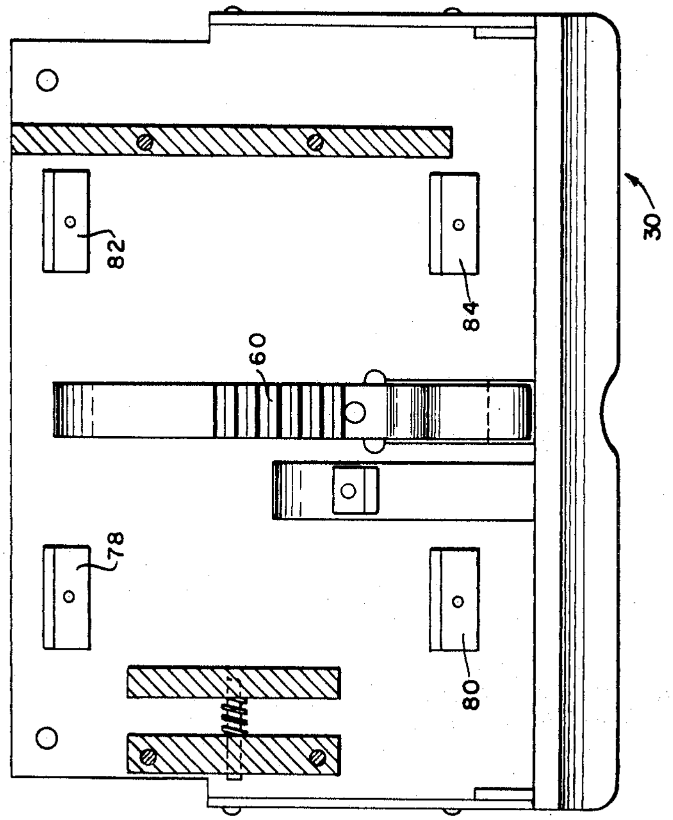
FIGURE 6 is a view taken along the line 6—6 of FIGURE 2.
Figure 5:
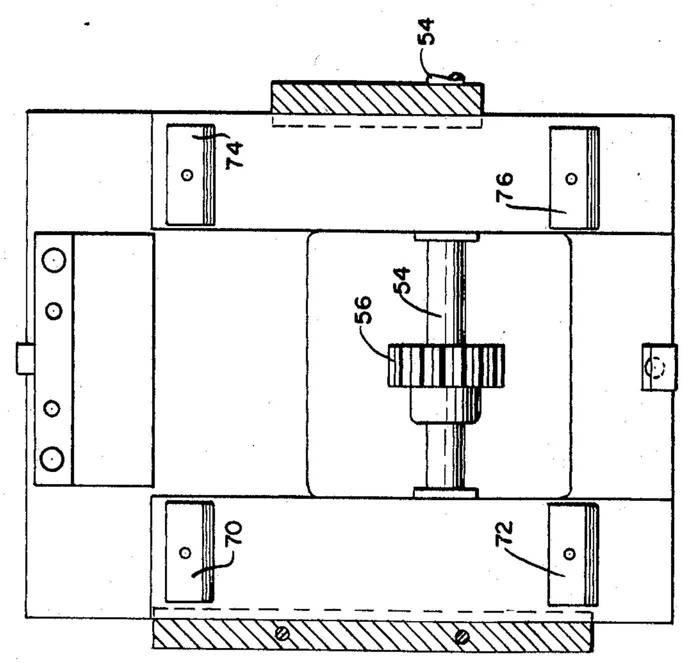
FIGURE 5 is a view taken along the line 5—5 of FIGURE 2.
Figure 7:
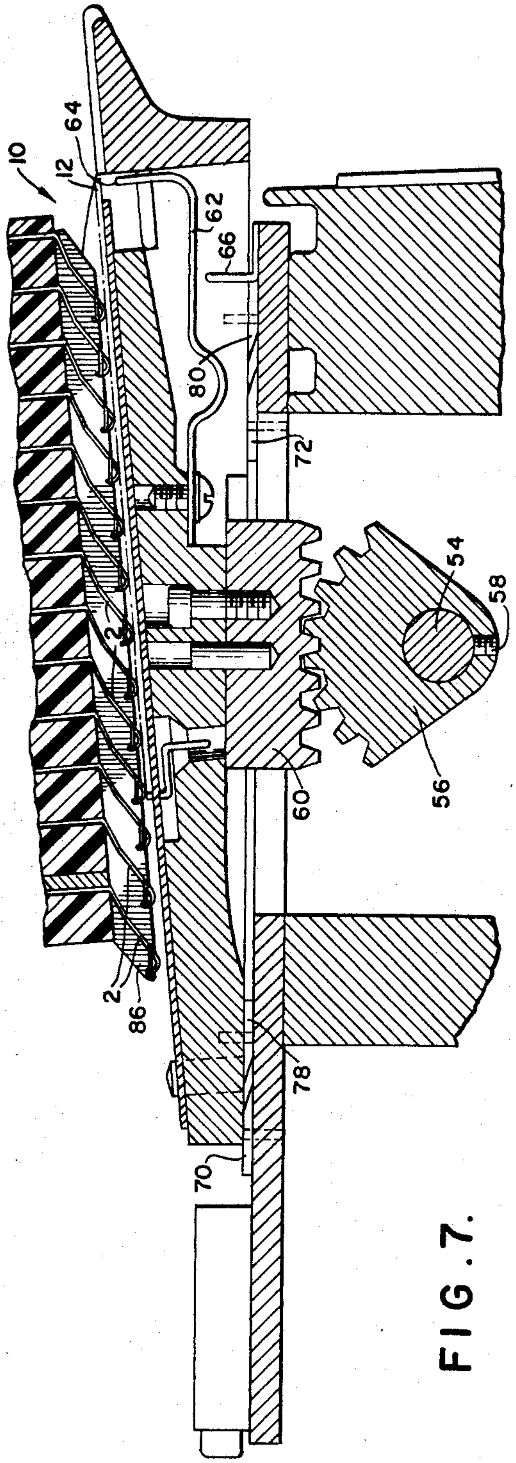
FIGURE 7 is a cross-sectional view as in FIGURE 2 with the carriage partially closed.

Upon pushing the handle 40 inwardly to close the carriage 30, the gear 56, as shown in FIGURE 7, will move in a counterclockwise direction under the influence of the shaft 54 and move the pinion gear 60 toward the left to close the drawer, the drawer being shown in a partially closed position in FIGURE 7. The drawer 30 will move inwardly with the contact spring members 2 still positioned sufficiently above the card 12 so that no rubbing takes place. At the same time, the spring member 62 moves off the bias member 66 and therefore recedes through the hole 64 into the interior portion of the carriage member 30. At this point the cam members 70, 72, 74 and 76, shown more clearly in FIGURE 5, are positioned adjacent the cam members 78, 80, 82 and 84 which are positioned in the upper portion of the housing and shown more clearly in FIGURE 6 (FIGURE 6 is the carriage 30). It will be noted that at this point the spring contact members 2 are still positioned above the card 12 and do not make contact therewith. As the drawer is closed, the cam members 78, 80, 82 and 84 ride up on the cam members 70, 72, 74 and 76 respectively to force the carriage 30 upwardly and force the spring members 2 into contact with the perforated card 12, thereby causing the spring members 2 which are opposite perforations to extend therethrough and make contact with contact members in the card reader.

The cam members are positioned so that the carriage 30 is moved upwardly when the spring members 2 are adjacent their associated positions on the card, i.e., the position on the card wherein they are to make contact. In this manner there is no rubbing of the spring members 2 over the card and possibly from hole to hole over the card to cause mutilation thereof.

Referring now more specifically to FIGURE 4, there is shown the contact spring and associated organization as shown and described previously with respect to FIGURES 2, 7 and 8. As shown best in FIGURE 4, a plurality of card stabilizers 86 is positioned adjacent each row of contact springs 2 and slightly below the extreme lower surface of the contact springs as shown with respect to FIGURES 2, 7 and 8. If desired, the card stabilizers 86 need not be placed adjacent each row of contact springs 2, but can be positioned at alternate rows or at every third row et cetera, as the case may be, to provide the desired degree of flattening of mutilated card members 12 which are positioned therein. The card stabilizers 86 are formed of non-conductive (insulating) material, preferably a plastic, and are cemented to the spring member apparatus.

Though the invention has been described in respect to a specific preferred embodiment thereof, any variations and modifications thereof will immediately become apparent to those skilled in the art. It is therefore the intention that the claims appended hereto be interpreted as broadly as possible in view of the prior art to include all such variations and modifications.

What is claimed is:

1. An improved card reader having a top portion and a base portion and comprising a slidable drawer including conductive paths thereon arranged to transport a card into and out of a position for card reading, a plurality of contact spring members secured in one of said top and base portions of said reader having arms extending to define contact surfaces which engage a card transported on said drawer, and means positioned on said drawer and the other of said top and base portions for forcing said drawer toward said contact spring members only after said contact spring members have been positioned in substantial registry with predetermined positions on said card.

2. A card reader as set forth in claim 1 wherein said last mentioned means includes a cam surface means positioned on said drawer and a cam surface means positioned on said other of said top and base portions.

3. A card reader as set forth in claim 2 wherein said cam surfaces are bevelled in complementary manner whereby one of said cam surface means can ride up on the other of said cam surface means.

4. A card reader as set forth in claim 2 wherein said cam surface means are positioned to provide camming action with respect to each other when said drawer is substantially in position to provide reading.

5. A card reader as set froth in claim 3 wherein said cam surface means are positioned to provide camming action with respect to each other when said drawer is substantially in position to provide reading.

6. A card reader as set forth in claim 2 wherein each of said cam surface means includes a plurality of cam surfaces.

7. An improved card reader having a top portion and a base portion and comprising a slidable drawer including conductive paths thereon arranged to transport a card into and out of a position for card reading, a plurality of contact spring members secured in one of said top and base portions of said card reader having contact arms extending to define contact surfaces which engage a card transported on said drawer, and means for eliminating contact arm movement from hole to hole of the card during card entry, said means including cam surface means positioned on said drawer and the other of said top and base portions for forcing said drawer toward said contact spring members only after said contact spring members are positioned in substantial registry with predetermined positions on said card.

8. An improved card reader having a top portion and a base portion and comprising a slidable drawer including conductive paths thereon arranged to transport a card into and out of a position for card reading, a plurality of contact spring members secured in one of said top and base portions of said card reader having arms extending to define contact surfaces which engage a card transported on said drawer, means positioned on said drawer and the other of said top and base portions for forcing said drawer toward said contact spring members only after the contact spring members have been positioned in substantial registry with predetermined positions on said card, and means for maintaining said contact spring members out of contact with said card prior to the contact spring members reaching said position of substantial registry.

9. An improved card reader having a top portion and a base portion and comprising a slidable drawer including conductive paths thereon adapted to transport a card into and out of an ultimate card-reading position, a plurality of contact spring members secured in one of said top and base portions of said card reader having contact arms extending to define contact surfaces adapted to engage a card transported on said drawer, and guide means for maintaining said contact spring members out of contact with said card until said ultimate card-reading position in which said contact spring members are positioned in substantial registry with predetermined positions on said card is reached by said drawer and then forcing said drawer toward said contact spring members when said ultimate card-reading position is reached thereby to eliminate contact arm movement from hole to hole of the card during card entry and thus prevent mutilation of cards, said guide means being positioned on said drawer and the other of said top and base portions.

10. A card reader as set forth in claim 9 wherein said contact spring members are arranged in rows and columns, and further comprising a plurality of card stabilizers positioned between predetermined ones of said columns of contact spring members and secured to said reader.

11. A card reader as set forth in claim 10 wherein said card stabilizers are formed of a rigid electrically nonconducting material and extend outwardly from said card reader a distance less than the outward extension from said card reader of said contact springs.

References Cited

UNITED STATES PATENTS

| | | | |
|---|---|---|---|
| 2,372,882 | 4/1945 | Daly et al. | |
| 2,941,054 | 6/1960 | Willis | 200—46 |
| 3,352,981 | 11/1967 | Ekers. | |

FOREIGN PATENTS

| | | |
|---|---|---|
| 1,300,255 | 6/1962 | France. |

ROBERT K. SCHAEFER, Primary Examiner

D. SMITH, Jr., Assistant Examiner

U.S. Cl. X.R.

200—166; 235—61.11